US012640037B2

(12) United States Patent
Genseal et al.

(10) Patent No.: US 12,640,037 B2
(45) Date of Patent: May 26, 2026

(54) POWERLINE PROXIMITY ALERT USING MACHINE PERCEPTION

(71) Applicant: Caterpillar Inc., Peoria, IL (US)

(72) Inventors: Andrew G. Genseal, Chillicothe, IL (US); Justin Lee Steinlage, Mackinaw, IL (US); Gowtham Venkatraman, Peoria, IL (US); Jun Zuo, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 157 days.

(21) Appl. No.: 18/764,963

(22) Filed: Jul. 5, 2024

(65) Prior Publication Data

US 2026/0011244 A1 Jan. 8, 2026

(51) Int. Cl.
*G08G 1/16* (2006.01)
*G01V 3/08* (2006.01)
*G01V 3/38* (2006.01)

(52) U.S. Cl.
CPC .............. *G08G 1/16* (2013.01); *G01V 3/088* (2013.01); *G01V 3/38* (2013.01)

(58) Field of Classification Search
CPC ............. G08G 1/16; G01V 3/088; G01V 3/38
USPC ......................................................... 340/435
See application file for complete search history.

(56) References Cited

U.S. PATENT DOCUMENTS 4,675,664 A * 6/1987 Cloutier ................. G08B 21/18
340/661
5,001,465 A * 3/1991 Siegel ................... B66C 15/065
340/685

6,600,426 B1 * 7/2003 Sacks ........................ B60P 1/00
340/684
8,866,469 B2 * 10/2014 Parr ......................... G01B 7/14
324/207.22
10,941,028 B2 3/2021 Cousins et al.
2007/0018841 A1 * 1/2007 Nickerson .............. H01Q 1/002
340/685
2011/0184679 A1 * 7/2011 Kalokitis ................ G06T 11/60
702/65

(Continued)

FOREIGN PATENT DOCUMENTS

CN 102976210 9/2015
CN 111207787 A 5/2020
CN 113247771 A 8/2021

(Continued)

OTHER PUBLICATIONS

Written Opinion and International Search Report for Int'l. Patent Appln. No. PCT/US2025/032823, mailed Sep. 8, 2025 (27 pgs).

*Primary Examiner* — Kerri L Mcnally

(57) ABSTRACT

An electric field proximity alert apparatus for a work machine operating at a worksite includes a set of perception sensors constructed to capture data of the worksite. An electric field sensor is constructed to measure an electric field about the work machine. Processor circuitry is constructed to accept the data captured by the perception sensors and to identify therefrom powerline structure data. The electric field measurement and the powerline structure data are accepted and used to compute electric field strength at selected locations on the work machine. An alert is issued responsive to the computed electric field strengths on the work machine reaching a proximity safety limit to the powerline.

20 Claims, 8 Drawing Sheets

(56)    References Cited

U.S. PATENT DOCUMENTS

2020/0062565  A1 *   2/2020  Cousins ............... B66F 17/006
2022/0397614  A1 *  12/2022  Yano ................... G01R 15/165

FOREIGN PATENT DOCUMENTS

JP          2024048263  A     4/2024
WO          2025118015  A1    6/2025

* cited by examiner

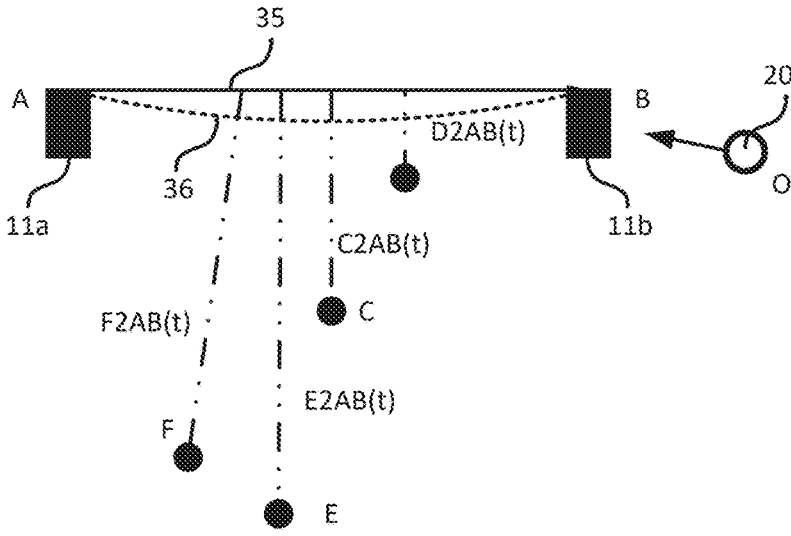
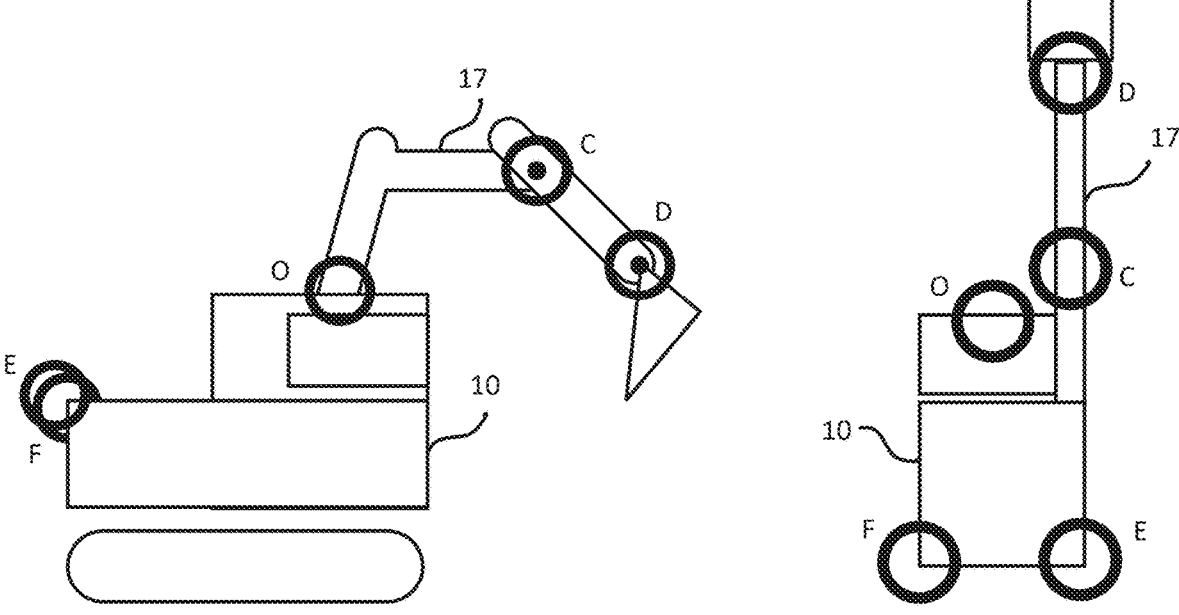
*FIG. 3*

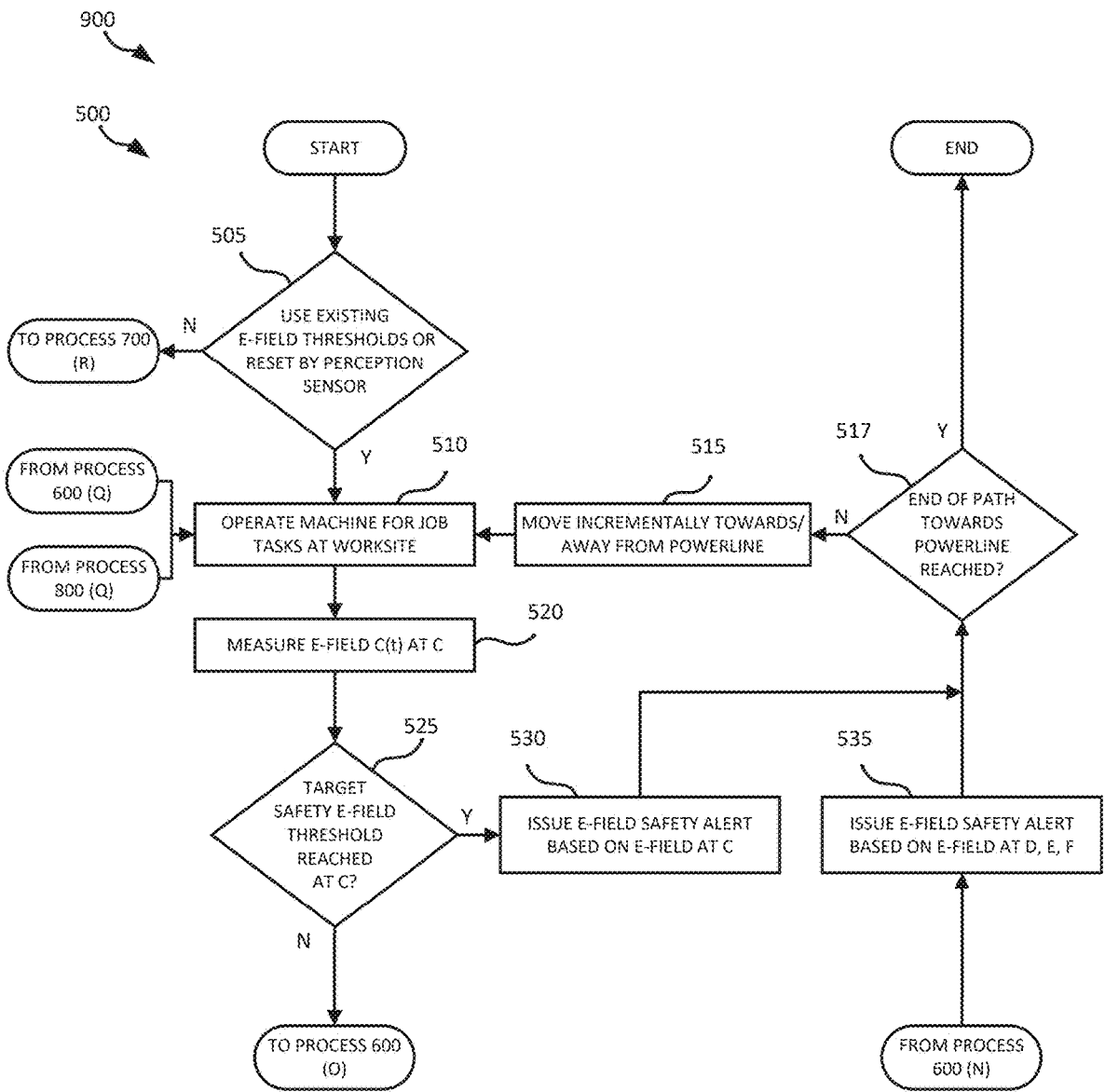

900

500

START

505

USE EXISTING
E-FIELD THRESHOLDS OR
RESET BY PERCEPTION
SENSOR

N → TO PROCESS 700 (R)

Y

FROM PROCESS 600 (Q)

FROM PROCESS 800 (Q)

510
OPERATE MACHINE FOR JOB TASKS AT WORKSITE

515
MOVE INCREMENTALLY TOWARDS/ AWAY FROM POWERLINE

517
END OF PATH TOWARDS POWERLINE REACHED?

N

Y → END

520
MEASURE E-FIELD C(t) AT C

525
TARGET SAFETY E-FIELD THRESHOLD REACHED AT C?

Y →

530
ISSUE E-FIELD SAFETY ALERT BASED ON E-FIELD AT C

535
ISSUE E-FIELD SAFETY ALERT BASED ON E-FIELD AT D, E, F

N

TO PROCESS 600 (O)

FROM PROCESS 600 (N)

FROM PROCESS 500 (O)

605 POWERLINE IS IN PERCEPTION SENSOR'S FIELD OF VIEW?

N → TO PROCESS 500 (Q)

Y

610 DETECT POWERLINE LOCATION USING PERCEPTION SENSOR

615 DETERMINE SHORTEST DISTANCES C2AB(t), D2AB(t), E2AB(t) & F2AB(t)

620 PREDICT E-FIELD STRENGTH AT D, E, F BASED ON C2AB(t), D2AB(t), E2AB(t) & F2AB(t)

625 TARGET SAFETY E-FIELD THRESHOLD REACHED AT D, E, F?

N → TO PROCESS 500 (Q)

Y

TO PROCESS 500 (N)

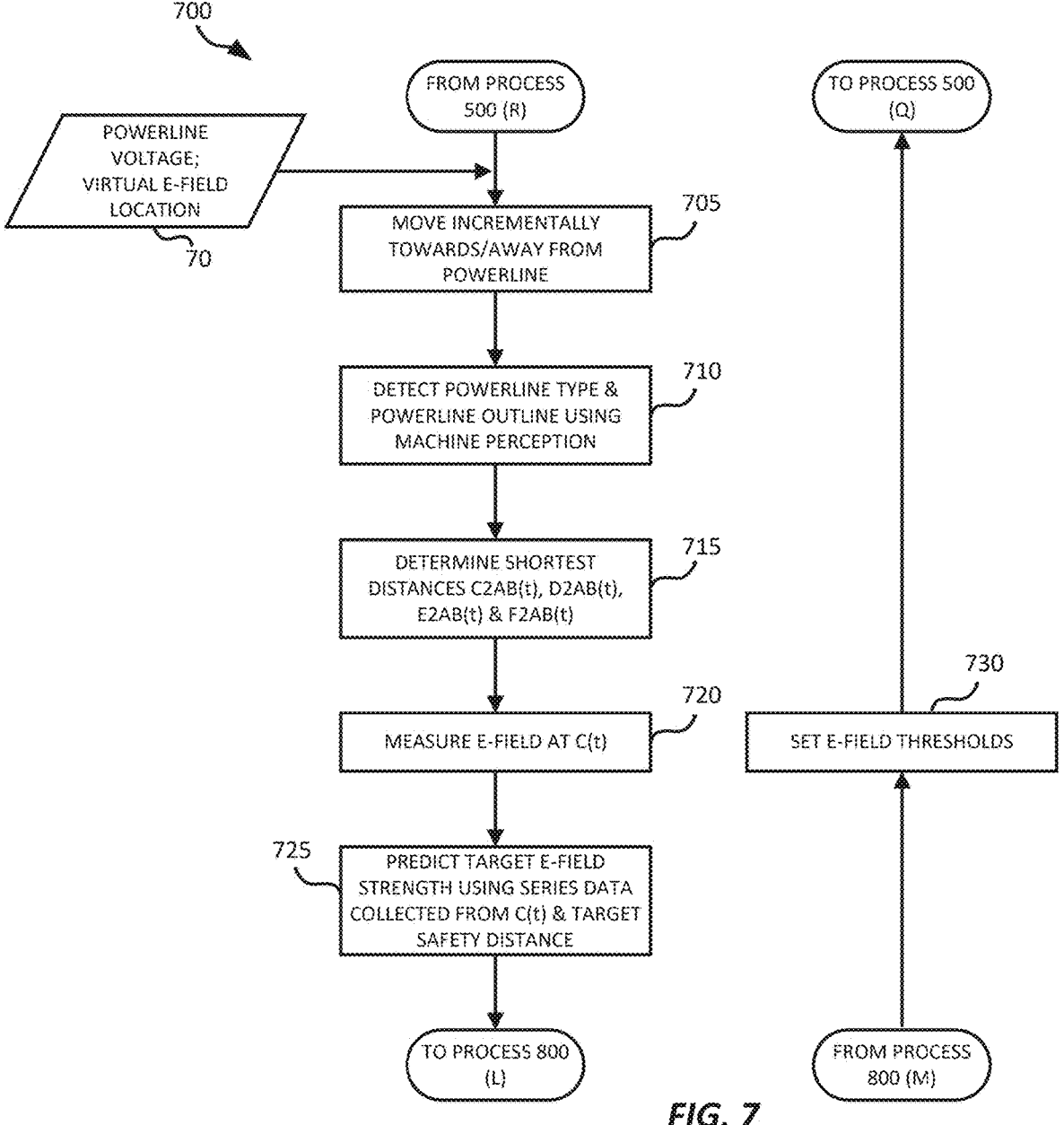

700

70

POWERLINE VOLTAGE; VIRTUAL E-FIELD LOCATION

FROM PROCESS 500 (R)

MOVE INCREMENTALLY TOWARDS/AWAY FROM POWERLINE
705

DETECT POWERLINE TYPE & POWERLINE OUTLINE USING MACHINE PERCEPTION
710

DETERMINE SHORTEST DISTANCES C2AB(t), D2AB(t), E2AB(t) & F2AB(t)
715

MEASURE E-FIELD AT C(t)
720

725
PREDICT TARGET E-FIELD STRENGTH USING SERIES DATA COLLECTED FROM C(t) & TARGET SAFETY DISTANCE

TO PROCESS 800 (L)

TO PROCESS 500 (Q)

730
SET E-FIELD THRESHOLDS

FROM PROCESS 800 (M)

*FIG. 7*

POWERLINE PROXIMITY ALERT USING MACHINE PERCEPTION

TECHNICAL FIELD

The present disclosure relates to machine perception. More specifically, the present disclosure relates to machine perception applied to work machines for safety reasons.

BACKGROUND

Operating heavy earthmoving work machines is inherently dangerous to the operator and personnel working in the area. It can be particularly hazardous when the work machine operates in the vicinity of overhead high voltage powerlines. To protect the machine/people working around the overhead high voltage powerline, a safety boundary and machine working zones are typically established onsite. The permitted distance is defined by Occupational Safety and Health Administration (OSHA) regulation 1926.1408 based on powerline source voltage. Present electric field strength measurement-based powerline detection systems are automatically sent warning signs to the operator by manually setting the alert e-field strength when the sensor is located at the target safety distance. The distance measurement device is typically not part of the powerline detection system and workers onsite generally must use a safe distance measurement method to properly setup a clearance line, a safe working zone, and a location at which a powerline safe distance alert is to be issued. The manual distance measurement and warning setup are time consuming and tedious. Certain implementations have one or more perception sensors (visible light camera, forward-looking infrared camera, radar, lidar, etc.) to detect people and objects near the work machine for collision avoidance, present systems remain dependent on settings entered by a human for protection against powerline hazards.

One powerline warning system is disclosed in U.S. Pat. No. 8,866,469. A power line proximity monitoring system has sensors mounted on a piece of equipment to sense a magnitude of an electric field. A controller is linked to the sensors and is operable to generate a sensor magnitude output signal corresponding to the sensed magnitude. A sensor transceiver is linked to the sensor controller and is operable to transmit the sensor magnitude output signal to a base station including a base controller configured to receive the plurality of sensor magnitude output signals and to compare the plurality of sensor magnitude output signals to a pre-determined threshold magnitude. A command signal is issued when the magnitude of at least one sensor magnitude output signal exceeds the threshold magnitude.

Whereas the apparatus disclosed in U.S. Pat. No. 8,866, 469 and others offer some protection against inadvertent powerline proximity, research, engineering and product development resources continue to be expended towards safer material handling in the presence of overhead powerlines.

SUMMARY

In one aspect of the present inventive concept, an electric field proximity alert apparatus for a work machine operating at a worksite includes a set of perception sensors constructed to capture data of the worksite. An electric field sensor is constructed to measure an electric field about the work machine. Processor circuitry is constructed to accept the data captured by the perception sensors and to identify therefrom powerline structure data. The electric field measurement and the powerline structure data are accepted and used to compute electric field strength at selected locations on the work machine. An alert is issued responsive to the computed electric field strengths on the work machine reaching a proximity safety limit to the powerline.

In another aspect of the present inventive concept, an electric field proximity alert method for a work machine operating at a worksite includes capturing data of the worksite via a set of perception sensors. an electric field about a powerline is measured by an electric field sensor and a powerline structure is identified from the captured data by machine perception to generate powerline structure data. Electric field strength is computed at selected locations on the work machine from the electric field measurement and the powerline structure data. An alert is issued responsive to the work machine reaching a safety limit on proximity to the powerline based on the computed electric field strength.

In yet another aspect of the present inventive concept, an electric field proximity alert system for a work machine operating at a worksite includes a set of perception sensors constructed to capture data of the worksite. An electric field sensor is constructed to measure an electric field about the work machine and a machine perception component is constructed to accept the data captured by the perception sensors and to identify therefrom powerline structure. An electric field processing component is constructed to accept the electric field measurement and the powerline structure data and to compute therewith electric field strength at selected locations on the work machine. An alert interface is constructed to issue an alert responsive to the computed electric field strengths on the work machine reaching a safety proximity limit to the powerline.

BRIEF DESCRIPTION OF THE DRAWINGS

FIG. 3 is an illustration of an excavator by which the present invention can be embodied.

FIG. 5 is a flow diagram of an exemplary e-field proximity alert process 900 by which the present inventive concept can be embodied.

FIG. 7 is a flowchart of an exemplary e-field limit setting process by which the present inventive concept may be embodied.

DESCRIPTION OF EXAMPLE EMBODIMENTS

Figure 1:
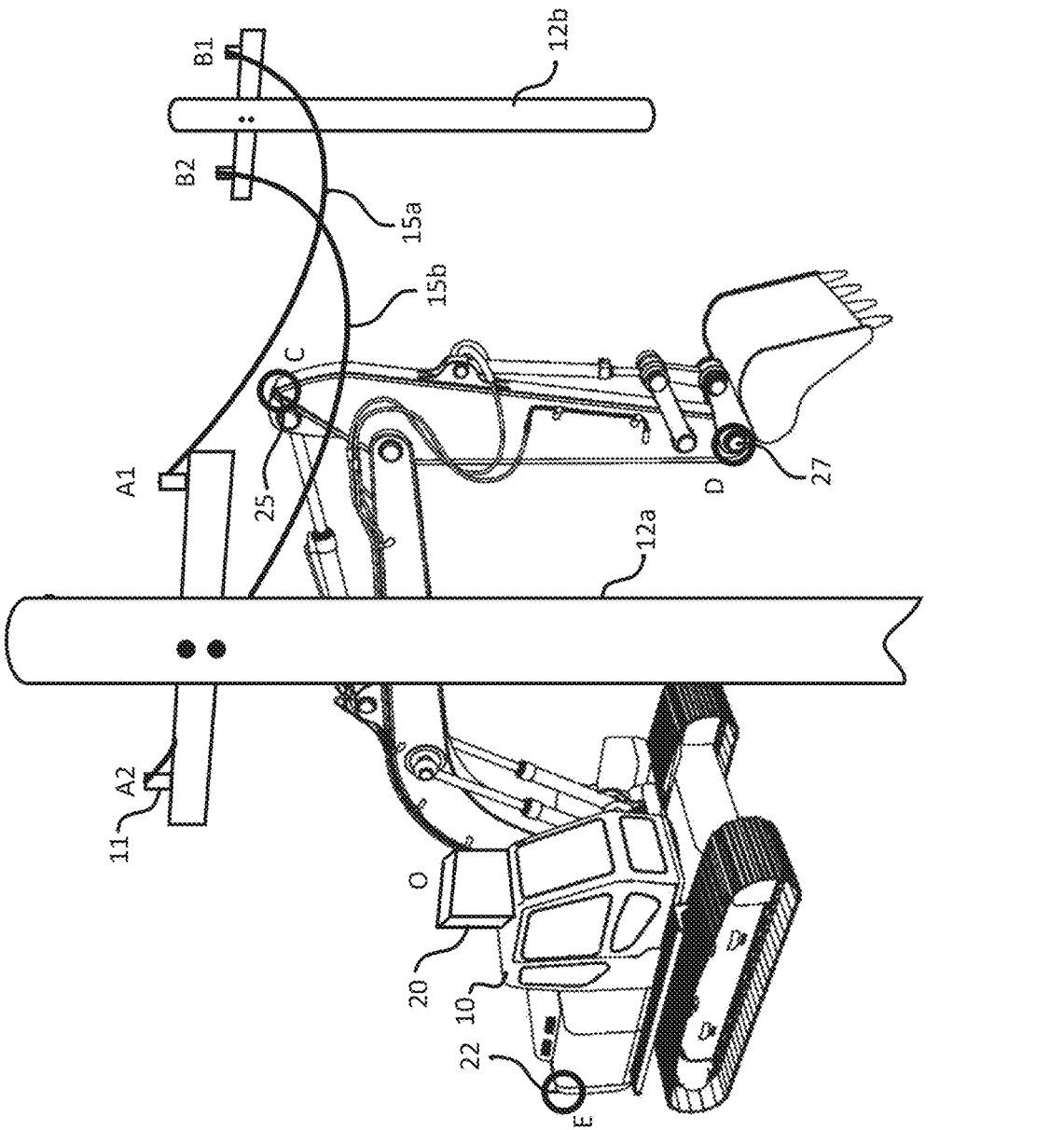
FIG. 1 is an illustration of an earth moving machine by which the present inventive concept can be embodied operating in the vicinity of powerlines.

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Additionally, the word exemplary is used herein to mean, "serving as an example, instance or illustration." Any embodiment of construction, process, design, technique, etc., designated herein as exemplary is not necessarily to be construed as preferred or advantageous over other such embodiments.

The figures described herein include schematic block diagrams illustrating various interoperating functional modules. Such diagrams are not intended to serve as electrical schematics and interconnections illustrated are intended to depict signal flow, various interoperations between functional components and/or processes and are not necessarily direct electrical connections between such components. Moreover, the functionality illustrated and described via separate components need not be distributed as shown, and the discrete blocks in the diagrams are not necessarily intended to depict discrete electrical components.

The techniques described herein are directed to machine perception applied to construction, mining and other earth moving activities. Upon review of this disclosure and appreciation of the concepts disclosed herein, the ordinarily skilled artisan will recognize other machine perception contexts in which the present inventive concept can be applied. The scope of the present invention is intended to encompass all such alternative implementations.

FIG. 1 is an illustration of an exemplary earth moving machine, in this case an excavator 10, operating in the vicinity of powerlines 15a and 15b, which are suspended on pylons 12a and 12b through insulators, representatively illustrated at insulator 11. As used herein, the term "pylon" is intended to refer to any structure that supports powerlines, including towers.

Excavator 10 may be equipped with a machine perception component 20 that can locate the boundaries of and distance to powerlines 15a and 15b and powerline supporting structure, e.g., pylons 12a and 12b. The powerline location can be detected by, for example, 4D imaging radar, lidar or object detection camera. The distance from powerline to machine can be calculated in computational resources described below based on the powerline location and machine outline.

Excavator 10 may have one or more electric field strength meters, referred to herein simply as an e-field meter, attached, such as at locations C, D, E and F. Certain embodiments are constructed with virtual sensors 22 and 27, for example, at one or more sensor locations C, D, E and/or F. As used herein, a "virtual sensor" is a location on the excavator body structure at which the electric field strength is computed as opposed to being directly probed. Virtual sensors, as defined here, may replace costly physical e-meters, as will be apparent in descriptions that follow.

The perception sensors may be included in machine perception 20 component may include visible light cameras, stereovision cameras, forward-looking infrared (FLIR) cameras, radar, lidar, to name a few known perception sensors. The data generated by machine perception component 20, referred to herein as perception data, may be the result of data fusion and other such techniques to achieve pylon recognition and, where resolution is sufficient to do so, recognition of the powerline itself. Here, a powerline may include multiconductor and/or multi-circuit transmission line configurations supported on a pylon.

As used herein, an "alert" may be an indication in the operator cab that warns or otherwise notifies the work machine operator. An alert may also be a signal that is accepted by machine controls to prevent operation of the work machine from violating e-field safety distance limits while the work machine is under the alert. The term is otherwise used herein according to its common usage of "an urgent notice."

Figure 2:
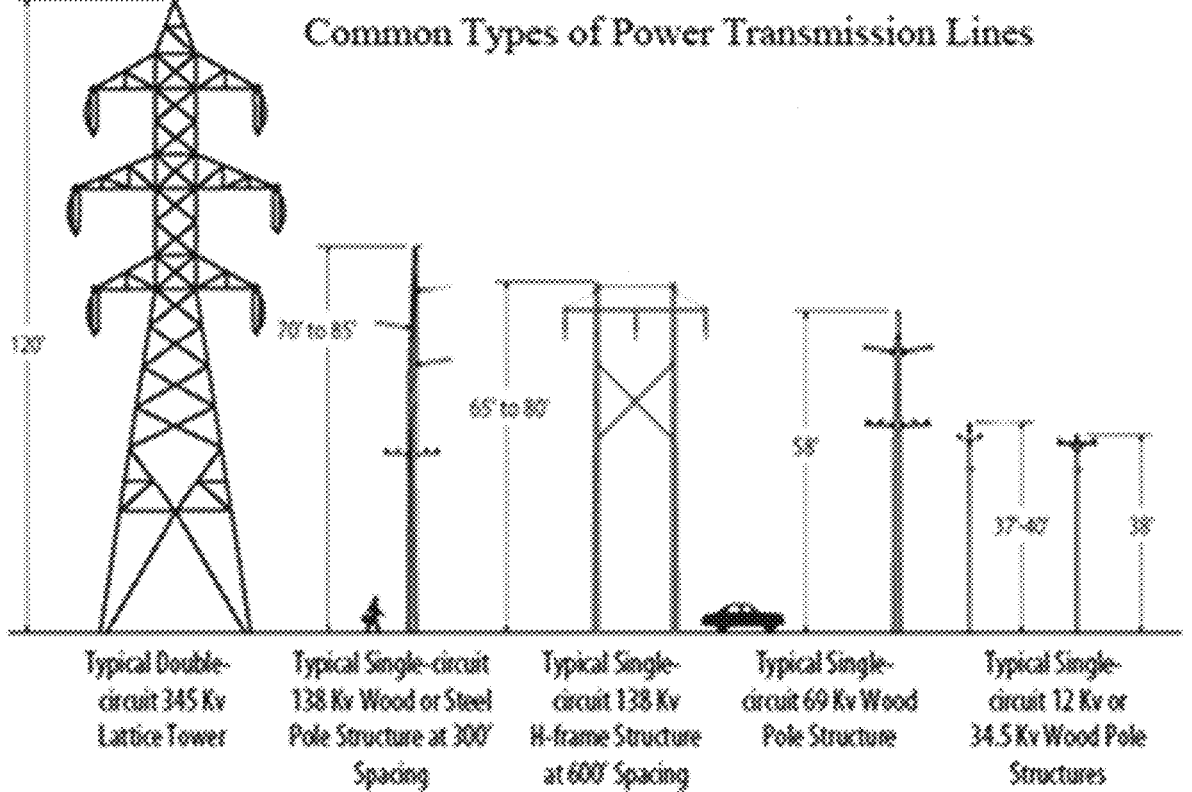
FIG. 2 is an illustration of possible supporting structures as a function of supply voltage.

FIG. 2 is an illustration of possible supporting structures as a function of supply voltage. Exemplary machine perception component 20 may be constructed to capture characteristic data from powerlines and/or the power line support structures, and to determine, such as by feature detection, shape recognition, etc., a supply voltage from the type of pylon in the captured image. Such pylon recognition process may be realized to trigger "pylon recognition" in an object classification process. For example, the pointing direction of machine perception component 20 may be linked to the pose of excavator 10. As such, the powerline support structure may at times be out of the field of view (FOV) of the machine perception component 20. As excavator 10 performs job tasks at the worksite, the pose of thereof may eventually face the powerline and the powerline supporting structure may come into the FOV of machine perception component 20. The object classification process realized in machine perception component 20, for example, may be executed when this happens and machine perception component 20 may provide, among other things, annotated perception data representing powerline support structures. The annotated perception data may include tags, labels or otherwise informative text associated with objects in the FOV of machine perception component 20, e-field simulation results, current proximity to set proximity safety limits, any of which may be displayed to, for example, the operator of excavator 10.

Machine perception component 20 may additionally identify points at which the powerline is attached or otherwise suspended. These attachment points, usually points at which an insulator is located, may serve as endpoints of an imaginary line from insulator to insulator in support of powerline distance estimation, as will be discussed further below.

FIG. 3 is schematic block diagram of an exemplary excavator 300 by which the present invention can be embodied. The lower panel of the figure (of top and side views of excavator 10) depicts locations of various features/equipment that are germane to powerline detection and safety. It is to be assumed that a physical e-field meter is located at C (e.g., boom articulation joint) while virtual e-field sensors are located at D (e.g. excavator bucket), E, and F (e.g., rear corners of counterweight). Other physical/virtual perception sensor configurations are possible to embody the present inventive concept.

As illustrated in the uppermost panel of FIG. 3, machine perception component 20 (located at O) may identify the type of electrical power pylon and therefrom the supply voltage associated with the construction of the pylon. As the excavator approaches the powerline, a processor onboard the excavator may determine the electric field strength at location C by direct probing thereof by a physical e-field sensor located thereat. The electric field strength at virtual sensors at D, E and F may be computed from interpolation or extrapolation of a series of real probe historical electrical field strength readings and the distance from C to AB over time. These distances, denoted C2AB(t), D2AB(t), E2AB(t) and F2AB(t), change over time as the work machine operates in the vicinity of the powerline. It is to be understood that while imaginary line 35 between locations A and B is illustrated as being a straight line, other line forms are possible, such as curves that may more closely account for transmission line sag 36. Conductor sag may be estimated from, for example, sag lookup tables based on conductor span between pylons and temperature, human input or by computer image processing on high resolution perception sensor data.

Figure 4:
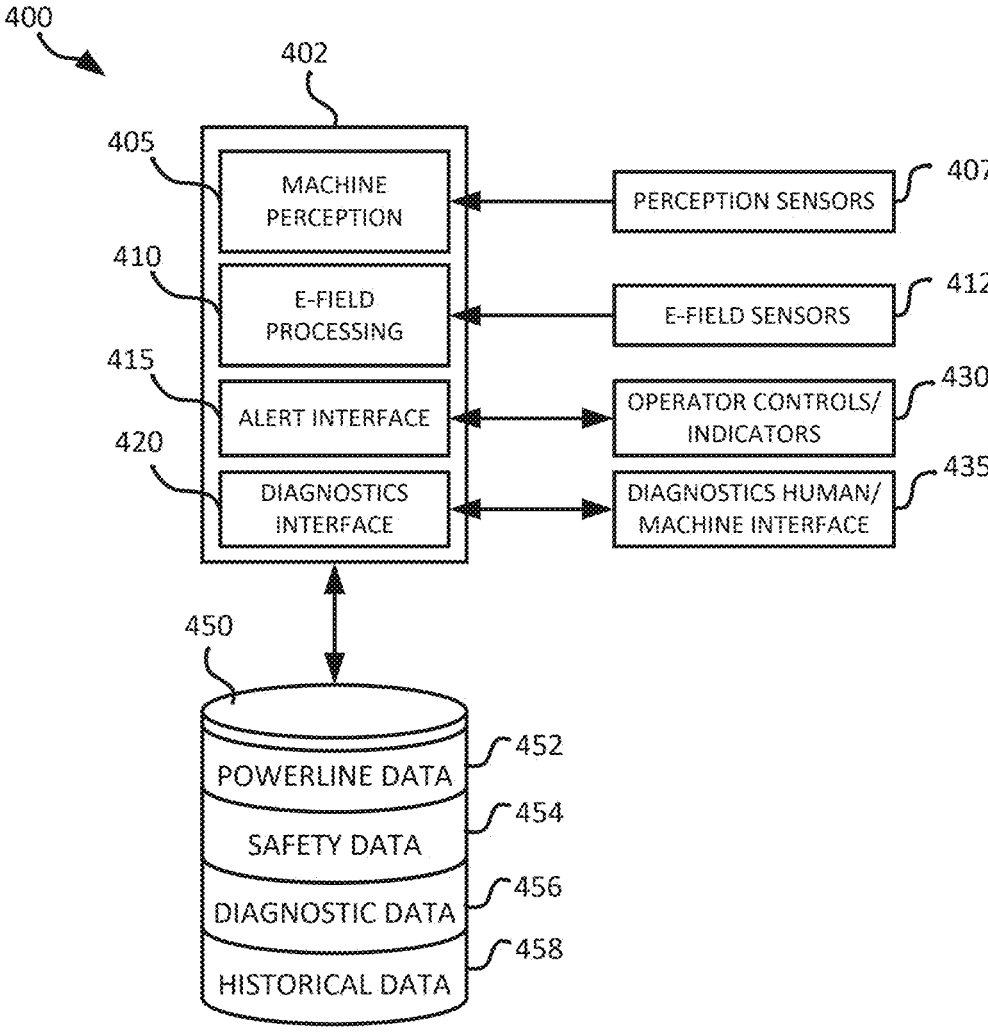
FIG. 4 is a schematic block diagram of a powerline proximity alert apparatus by which the present inventive concept can be embodied.

FIG. 4 is a schematic block diagram of a powerline proximity alert apparatus 400 by which the present inventive concept can be embodied. Apparatus 400 may be realized in processor circuitry 402 and memory circuitry 450 and constructed to compute e-field strength at locations on the excavator or other work machine.

Apparatus 400 may include a suite of perception sensors 407 constructed to probe the worksite environment for powerlines. As indicated above, perception sensors 407 may include visible light cameras, FLIR cameras, radar, lidar, among others. The output of sensor suite 407 may include characteristic data, such as images and annotations thereon, bounding boxes representing location and size of objects, velocity information and types of objects, among other things.

Machine perception component 405 may be constructed or otherwise configured to accept perception data from perception sensors 407 and to identify therefrom powerline supporting structures and, when data resolution allows, the powerlines themselves. Machine perception component 405 may determine the supply voltage on the powerline by, for example, consulting a powerline information database 452. The determined voltage may be used to query a safety regulation database 454 to determine a safe distance limit accordingly.

As previously indicated, the permitted safety distance limit is regulated by OSHA and similar organizations around the world. Embodiments of the present inventive concept allow for setting a proximity safety limit that is greater than the regulated permitted safety distance limit. When so embodied, the proximity safety limit may be adjusted over time as environmental conditions, e.g., temperature and humidity, vary. That is, the proximity safety limit can be set to a new distance value as conditions warrant.

The e-field strength near the powerline is well understood and many e-field modeling/simulation techniques may be used to implement e-field processing component 410. Such models/simulations account for the e-field strength being a function of multiple parameters such as voltage, distance to powerline, transmission line design, ambient temperature and humidity, etc. E-field normal values can be predicted from powerline voltage and location of the sensor relative to the powerline.

In addition to e-field modeling/simulation computation, e-field processing component 410 may be constructed or otherwise configured to accept electric field data from e-field sensors 412 and perception data from machine perception component 405 to determine therefrom electric field strength about the excavator in the presence of powerlines. For example, using the direct measurement of the electric field, the distance from the perception sensor to the powerline and electric field strength models/simulations, the strength of the electric field at the virtual sensor locations can be estimated.

Alert interface 415 may be constructed or otherwise configured to accept e-field strength data from e-field processing component 410 and to issue an alert when the excavator, or a portion thereof, reaches the e-field proximity safety limit. Perception sensors 407 may guide e-field limit setting. After the setting is done, e-field sensors may measure e-field strength continuously and alerts are issued when appropriate.

Operator controls/indicators 430 may accept issued alert data and may include a display on which the issued alert data is presented to an operator. Embodiments of the invention may allow communication with a machine controller that limits movement of the excavator when the alert has been issued.

Embodiments of the present inventive concept may include diagnostic mechanisms for troubleshooting possible malfunctions. For example, time-series sensor data stored in, for example, historical data memory 458 may be analyzed against maximum and minimum e-field strength values set by, for example, authorized users only. When the time-series sensor data falls outside the maximum and minimum e-field strength values, the system may exit for troubleshooting. Diagnostics human/machine interface 435 may be operated by a technician to do such troubleshooting. Other factors can be used to predict the min/max values based the best and worst operational scenarios and/or environmental conditions. Min/max lookup tables can be created for various transmission lines, which may be stored in diagnostic data memory 456.

FIG. 5 is a flow diagram of an exemplary e-field proximity alert process 900 by which the present inventive concept can be embodied. In the illustrated implementation, process 900 may include e-field sensor safety alert process 500, virtual e-field prediction process 600, field limits setting by perception sensor process 700, and e-field measurement, powerline voltage and powerline location diagnostics process 800 that interoperate as described below. These processes may be realized in processor circuitry, such as processor circuitry 402, and memory circuitry, such as memory circuitry 450 of FIG. 4.

In operation 505 of process 500, it may be determined whether existing e-field limits should be used, or a reset of the perception sensor has occurred and, if not, process 900 may transition to operation 705 discussed below with reference to FIG. 7. Such a reset may be compelled when environmental conditions change, such as when the system is offline for an extended period. If existing e-field limits are to be used and the perception sensor has not been reset, as determined in operation 505, the work machine may be operated along a work path performing work tasks in operation 510. Process 500 may transition to operation 520, by which the work machine, e.g., an excavator, may measure powerline e-field C(t) using a real e-field sensor as the work machine traverses the work path. In operation 525, it may be determined whether a target safety e-field limit has been reached. If so, process 500 may transition to operation 530, whereby an e-field safety alert may be issued based on the e-field measurement C(t) at location C. If the target safety e-field limit has not been reached, process 500 may transition to operation 605 of FIG. 6 and may continue from that point.

In operation 517, it may be determined whether the end of the path on which the excavator is conveyed has been reached. If so, process 500 may terminate. If not, process 500 may transition to operation 515, in which the work machine moves incrementally towards/away from the powerline. If, at operation 525, it is determined that the target safety distance has not been reached, process 500 may transition to operation 515, during which the work machine may move incrementally towards/away from the powerline. Process 500 may transition back to operation 510, in which the work machine may be operated to perform work tasks, and may continue from that point.

Figure 6:
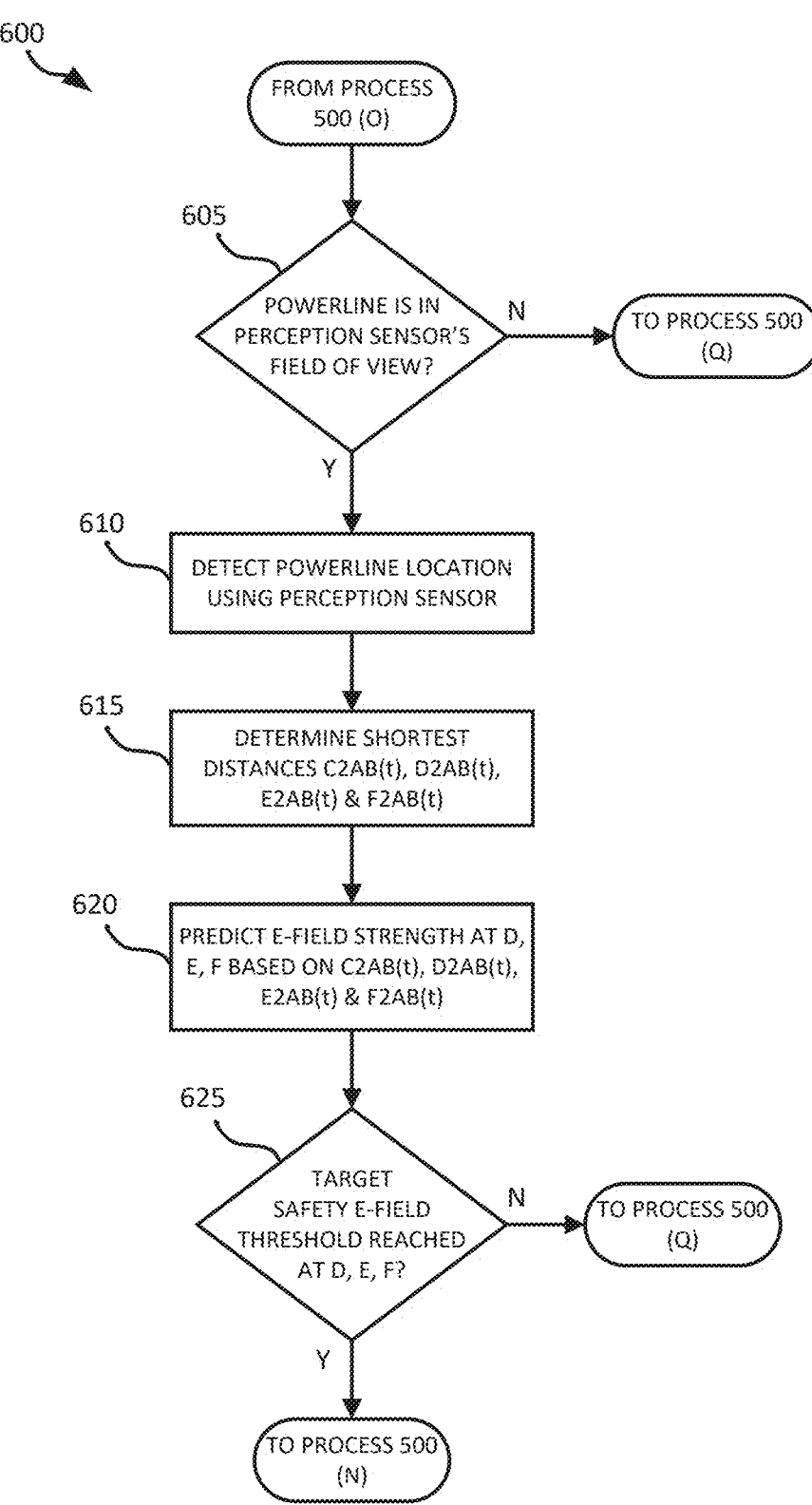
FIG. 6 is a flowchart of an exemplary virtual e-field prediction by which the present inventive concept can be embodied.

FIG. 6 is a flowchart of an exemplary virtual e-field prediction process 600 by which perception sensor(s) may be used to predict e-field strength at locations on the work machine at which no actual e-field sensors are located. In operation 605, it may be determined if the powerline is in the perception sensor's field of view. If not, process 900 may transition to operation 510, by which the work machine performs job tasks, and may continue from that point. If, however, the powerline is within the perception sensor's field of view, the perception sensor may be used to compute the location of the powerline relative to the work machine. Such machine perception may identify powerline support structure, e.g., pylons, towers, etc. In operation 615, the shortest distances to line AB from sensor locations C, D, E and F are computed and, in operation 620, the e-field strength is measured at sensor location C, which may be by an actual e-field meter. In operation 620, the e-fields at virtual sensor locations D, E and F may be predicted knowing e-field historical data (e-field strength and C2AB (t)) stored in historical data memory 458, for example, and the distance from those virtual sensor locations to line AB as a function of time. In operation 625, it may be determined whether a target safety e-field limit has been reached at location D, E or F. If not, process 600 may transition to operation 510 during which the work machine may perform job tasks at the worksite. If, however, it is determined that the target safety e-field limit has been reached, process 600 may transition to operation 535, during which an e-field safety alert may be issued based on the e-field at location D, E and F.

FIG. 7 is a flowchart of an exemplary e-field limit setting process 700 by which the present inventive concept may be embodied. From operation 505 of process 500, process 900 may transition to operation 705, during which the work machine may move incrementally towards/away from powerline. It is to be noted that the powerline voltage and virtual e-field sensors locations may be provided to operation 700. In operation 710, the powerline type and outline may be detected, such as by machine perception. Process 700 may transition to operation 715, whereby the shortest distances C2AB(t), D2AB(t), E2AB(t) and F2AB(t) may be determined, such as by tessellation techniques. In operation 720, the time-varying e-field is measured at location C and in operation 725, e-field strength is predicted from the measured e-field of operation 720 and a target safety distance. Process 700 may then transition to operation 805 of FIG. 8.

Figure 8:
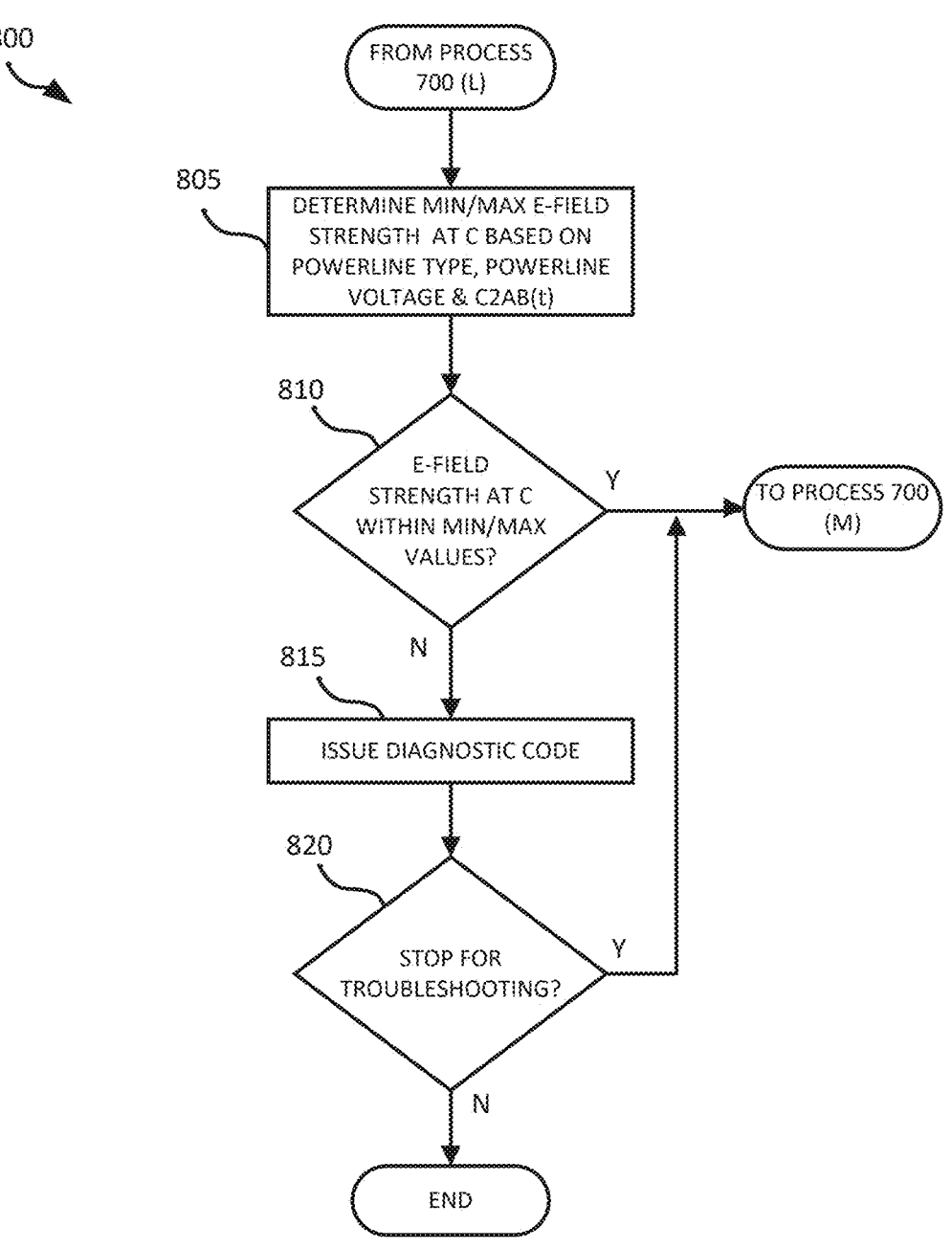
FIG. 8 is a flowchart of an exemplary e-field measurement, powerline voltage, powerline location detection diagnostics process by which the present inventive concept can be embodied.

FIG. 8 is a flowchart of an exemplary e-field measurement, powerline voltage, powerline location detection diagnostics process 800 by which the present inventive concept can be embodied. From operation 725 of process 700 may transition to operation 805 by which minimum/maximum e-field strength at location C may be determined based on powerline voltage, distance C2AB(t) and other factors such as powerline design and environmental conditions. In operation 810, it may be determined whether the e-field strength at location C is within maximum and minimum values. If so, process 800 may transition to operation 730 of process 700 by which e-field safety limits are set and then to operation 510 by which job tasks are performed by the work machine. If it is determined in operation 810 that the e-field strength is outside the minimum and maximum values, process 800 may transition to operation 815 by which a diagnostic code is issued and, in operation 820, it may be determined whether process 900 should terminate for troubleshooting using the diagnostic code for guidance. If troubleshooting is to proceed, process 900 may transition to operation 510 by which job tasks are performed by the work machine.

Certain embodiments of the present general inventive concept provide for the functional components to manufactured, transported, marketed and/or sold as processor instructions encoded on computer-readable media. The present general inventive concept, when so embodied, can be practiced regardless of the processing platform on which the processor instructions are executed and regardless of the manner by which the processor instructions are encoded on the computer-readable medium.

It is to be understood that the computer-readable medium described above may be any non-transitory medium on which the instructions may be encoded and then subsequently retrieved, decoded and executed by a processor, including electrical, magnetic and optical storage devices. Examples of non-transitory computer-readable recording media include, but not limited to, read-only memory (ROM), random-access memory (RAM), and other electrical storage; CD-ROM, DVD, and other optical storage; and magnetic tape, floppy disks, hard disks and other magnetic storage. The processor instructions may be derived from algorithmic constructions in various programming languages that realize the present general inventive concept as exemplified by the embodiments described above.

Embodiments of the disclosed subject matter can also be as set forth according to the following parentheticals.

(1). An electric field proximity alert apparatus for a work machine operating at a worksite comprising: a set of perception sensors constructed to capture data of the worksite; an electric field sensor constructed to measure an electric field about the work machine; and processor circuitry constructed to: accept the data captured by the perception sensors and to identify therefrom powerline structure data; accept the electric field measurement and the powerline structure data and to compute therewith electric field strength at selected locations on the work machine; and issue an alert responsive to the computed electric field strengths on the work machine reaching a proximity safety limit to the powerline.

(2). The apparatus of (1), wherein the electric field sensor is the sole electric field sensor on the work machine and the selected locations on the work machine at which the electric field strength is computed are void of electric field sensors.

(3). The apparatus of (1), wherein the processor circuitry is further constructed to control movement of the work machine responsive to the alert being issued.

(4). The apparatus of (1), wherein the processor circuitry is further constructed to warn the work machine operator that the work machine has reached the proximity safety limit.

(5). The apparatus of (1), wherein the processor is constructed to issue a diagnostic code responsive to the electric field measurement falling outside of maximum or minimum electric field values.

(6). The apparatus of (1), wherein the processor circuitry is further constructed to: issue a proximity safety alert based on the electric field measurement by the electric field sensor; and issue the proximity safety alert based on predicted electric field strength at the selected locations on the work machine that are void of the electric field sensor.

(7). The apparatus of (1), wherein the processor circuitry is further constructed to: assemble a time series of the electric field measurement over time; and predict a proximity safety distance based on the time series and a distance of the electric field sensor from the powerline.

(8). The apparatus of (1), wherein the electric field sensor is the sole electric field sensor on the work machine and the selected locations on the work machine at which the electric field strength is computed are void of electric field sensors.

(9). An electric field proximity alert method for a work machine operating at a worksite, the method comprising: capturing data of the worksite via a set of perception sensors; measuring an electric field about a powerline at the worksite by an electric field sensor; identifying from the captured data a powerline structure by machine perception to generate powerline structure data; computing electric field strength at selected locations on the work machine from the electric field measurement and the powerline structure data; and issuing an alert responsive to the work machine reaching a safety limit on proximity to the powerline based on the computed electric field strength.

(10). The method of (9), further comprising controlling movement of the work machine responsive to the alert being issued.

(11). The method of (9), further comprising issuing a diagnostic code responsive to the electric field measurement falling outside of maximum or minimum electric field values.

(12). The method of (9), further comprising issuing the alert based on the electric field measurement by the electric field sensor.

(13). The method of (9) or (12), further comprising issuing the alert based on predicted electric field strength at the selected locations on the work machine that are void of the electric field sensor.

(14). The method of (9), further comprising: assembling a time series of the electric field measurement over time; and predicting a proximity safety distance based on the time series and a distance of the electric field sensor from the powerline.

(15). An electric field proximity alert system for a work machine operating at a worksite, the apparatus comprising: a set of perception sensors constructed to capture data of the worksite; an electric field sensor constructed to measure an electric field about the work machine; a machine perception component constructed to accept the data captured by the perception sensors and to identify therefrom powerline structure; an electric field processing component constructed to accept the electric field measurement and the powerline structure data and to compute therewith electric field strength at selected locations on the work machine; and an alert interface constructed to issue an alert responsive to the computed electric field strengths on the work machine reaching a safety proximity limit to the powerline.

(16). The system of (15), wherein the electric field sensor is the sole electric field sensor on the work machine and the selected locations on the work machine at which the electric field strength is computed are void of electric field sensors.

(17). The system of (15), wherein the selected locations on the work machine at which the electric field strength is computed includes locations on a body of the work machine.

(18). The system of (15), further comprising a diagnostic interface component constructed to issue a diagnostic code responsive to the electric field measurement falling outside of maximum or minimum electric field values.

(19). The system of (15), wherein the alert interface constructed to: issue a proximity safety alert based on the electric field measurement by the electric field sensor; and issue the proximity safety alert based on predicted electric field strength at the selected locations on the work machine that are void of the electric field sensor.

(20). The system of (15), wherein the electric field processing unit is constructed to: assemble a time series of the electric field measurement over time; and predict a proximity safety distance based on the time series and a distance of the electric field sensor from the powerline.

INDUSTRIAL APPLICABILITY

As previously discussed, operating heavy machinery in the presence of powerlines is dangerous work. To ameliorate such hazards, heavy machinery may be outfitted with proximity alert devices that alert the machine operator when the machine approaches the powerline. This disclosure describes improvements on this safety feature to further protect the machine operator, the machine itself and personnel in the area. Such improvements to a safety feature are applicable in different contexts, e.g., construction and mining.

The descriptions above are intended to illustrate possible implementations of the present inventive concept and are not restrictive. Many variations, modifications and alternatives will become apparent to the skilled artisan upon review of this disclosure. For example, components equivalent to those shown and described may be substituted therefore, elements and methods individually described may be combined, and elements described as discrete may be distributed across many components. The scope of the invention should therefore be determined not with reference to the description above, but with reference to the appended claims, along with their full range of equivalents.

What is claimed is:

1. An electric field proximity alert apparatus for a work machine operating at a worksite comprising:

a set of perception sensors constructed to capture data of the worksite;

an electric field sensor constructed to measure an electric field about the work machine; and processor circuitry constructed to:

accept the data captured by the perception sensors and to identify therefrom powerline structure data;

accept the electric field measurement and the powerline structure data and to compute therewith electric field strength at selected locations on the work machine; and issue an alert responsive to the computed electric field strengths on the work machine reaching a proximity safety limit to the powerline.

2. The apparatus of claim 1, wherein the electric field sensor is the sole electric field sensor on the work machine and the selected locations on the work machine at which the electric field strength is computed are void of electric field sensors.

3. The apparatus of claim 1, wherein the processor circuitry is further constructed to control movement of the work machine responsive to the alert being issued.

4. The apparatus of claim 1, wherein the processor circuitry is further constructed to warn the work machine operator that the work machine has reached the proximity safety limit.

5. The apparatus of claim 1, wherein the processor is constructed to issue a diagnostic code responsive to the electric field measurement falling outside of maximum or minimum electric field values.

6. The apparatus of claim 1, wherein the processor circuitry is further constructed to:

issue a proximity safety alert based on the electric field measurement by the electric field sensor; and issue the proximity safety alert based on predicted electric field strength at the selected locations on the work machine that are void of the electric field sensor.

7. The apparatus of claim 1, wherein the processor circuitry is further constructed to:

assemble a time series of the electric field measurement over time; and predict a proximity safety distance based on the time series and a distance of the electric field sensor from the powerline.

8. The apparatus of claim 1, wherein the electric field sensor is the sole electric field sensor on the work machine and the selected locations on the work machine at which the electric field strength is computed are void of electric field sensors.

9. An electric field proximity alert method for a work machine operating at a worksite, the method comprising:

capturing data of the worksite via a set of perception sensors;

measuring an electric field about a powerline at the worksite by an electric field sensor;

identifying from the captured data a powerline structure by machine perception to generate powerline structure data;

computing electric field strength at selected locations on the work machine from the electric field measurement and the powerline structure data; and issuing an alert responsive to the work machine reaching a safety limit on proximity to the powerline based on the computed electric field strength.

10. The method of claim 9, further comprising controlling movement of the work machine responsive to the alert being issued.

11. The method of claim 9, further comprising issuing a diagnostic code responsive to the electric field measurement falling outside of maximum or minimum electric field values.

12. The method of claim 9, further comprising issuing the alert based on the electric field measurement by the electric field sensor.

13. The method of claim 12, further comprising issuing the alert based on predicted electric field strength at the selected locations on the work machine that are void of the electric field sensor.

14. The method of claim 9, further comprising:

assembling a time series of the electric field measurement over time; and predicting a proximity safety distance based on the time series and a distance of the electric field sensor from the powerline.

15. An electric field proximity alert system for a work machine operating at a worksite, the apparatus comprising:

a set of perception sensors constructed to capture data of the worksite;

an electric field sensor constructed to measure an electric field about the work machine;

a machine perception component constructed to accept the data captured by the perception sensors and to identify therefrom powerline structure;

an electric field processing component constructed to accept the electric field measurement and the powerline structure data and to compute therewith electric field strength at selected locations on the work machine; and an alert interface constructed to issue an alert responsive to the computed electric field strengths on the work machine reaching a safety proximity limit to the powerline.

16. The system of claim 15, wherein the electric field sensor is the sole electric field sensor on the work machine and the selected locations on the work machine at which the electric field strength is computed are void of electric field sensors.

17. The system of claim 16, wherein the selected locations on the work machine at which the electric field strength is computed includes locations on a body of the work machine.

18. The system of claim 15, further comprising a diagnostic interface component constructed to issue a diagnostic code responsive to the electric field measurement falling outside of maximum or minimum electric field values.

19. The system of claim 15, wherein the alert interface constructed to:

issue a proximity safety alert based on the electric field measurement by the electric field sensor; and issue the proximity safety alert based on predicted electric field strength at the selected locations on the work machine that are void of the electric field sensor.

20. The system of claim 15, wherein the electric field processing unit is constructed to assemble a time series of the electric field measurement over time; and predict a proximity safety distance based on the time series and a distance of the electric field sensor from the powerline.

* * * * *